(12) United States Patent
Uchihara

(10) Patent No.: US 11,258,943 B2
(45) Date of Patent: Feb. 22, 2022

(54) IMAGING APPARATUS AND METHOD FOR CONTROLLING THE SAME

(71) Applicant: CANON KABUSHIKI KAISHA, Tokyo (JP)

(72) Inventor: Masato Uchihara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/902,624

(22) Filed: Jun. 16, 2020

(65) Prior Publication Data

US 2020/0404165 A1 Dec. 24, 2020

(30) Foreign Application Priority Data

Jun. 18, 2019 (JP) .............................. JP2019-113204

(51) Int. Cl.
*H04N 5/232* (2006.01)

(52) U.S. Cl.
CPC ..... *H04N 5/23222* (2013.01); *H04N 5/23216* (2013.01); *H04N 5/232411* (2018.08)

(58) Field of Classification Search
CPC ......... H04N 5/23222; H04N 5/232411; H04N 5/23216; H04N 5/232061; H04N 5/247; H04N 5/23206; H04N 5/23241
USPC ...................................................... 348/222.1
See application file for complete search history.

(56) References Cited

U.S. PATENT DOCUMENTS

| | | | | |
|---|---|---|---|---|
| 8,427,544 B2* | 4/2013 | Watanabe | .......... | H04N 5/23203 348/211.11 |
| 8,760,518 B2* | 6/2014 | Matsuzawa | ........ | H04N 5/23219 348/157 |
| 9,077,889 B2* | 7/2015 | Hayashi | ............... | H04N 5/2354 |
| 9,253,389 B2* | 2/2016 | Muraki | ............ | H04N 5/232061 |
| 9,560,269 B2* | 1/2017 | Baldwin | ............ | H04N 5/23222 |
| 10,200,599 B1* | 2/2019 | Baldwin | ............ | H04N 5/23216 |
| 10,708,500 B2* | 7/2020 | Kaneko | ................ | H04N 9/8205 |
| 2011/0050925 A1* | 3/2011 | Watanabe | .......... | H04N 5/23203 348/211.2 |
| 2011/0216208 A1* | 9/2011 | Matsuzawa | ........ | H04N 5/23219 348/211.2 |
| 2014/0247371 A1* | 9/2014 | Matsuzawa | ........ | H04N 5/23203 348/211.2 |
| 2015/0002639 A1* | 1/2015 | Kwon | .................. | H04N 13/254 348/47 |
| 2019/0020820 A1* | 1/2019 | Kaneko | ............ | H04N 21/21805 |
| 2019/0199926 A1* | 6/2019 | An | .......................... | H04N 5/232 |
| 2019/0266427 A1* | 8/2019 | Chang | ..................... | G06F 21/32 |

FOREIGN PATENT DOCUMENTS

JP 2007-266781 A 10/2007
JP 2010-21920 A 1/2010

* cited by examiner

*Primary Examiner* — Pritham D Prabhakher
(74) *Attorney, Agent, or Firm* — Canon U.S.A., Inc. I.P. Division

(57) ABSTRACT

A method for controlling a plurality of imaging apparatuses capable of communicating with each other includes acquiring information about an image capturing angle of view of each of the plurality of imaging apparatuses, and determining an image capturing parameter to be used when one imaging apparatus among the plurality of imaging apparatuses shifts to a use state, based on information about an image capturing parameter or evaluation value in an other imaging apparatus, and an image capturing angle of view of each of the other imaging apparatus and the one imaging apparatus.

19 Claims, 7 Drawing Sheets

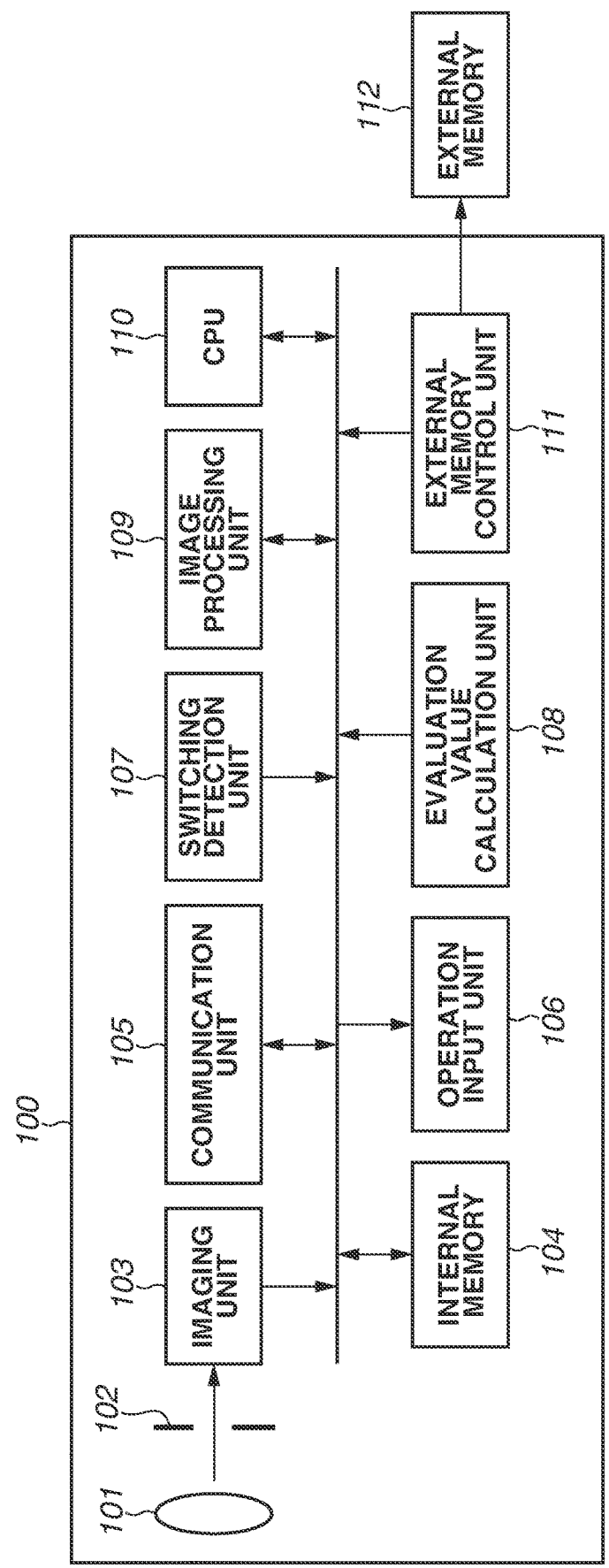

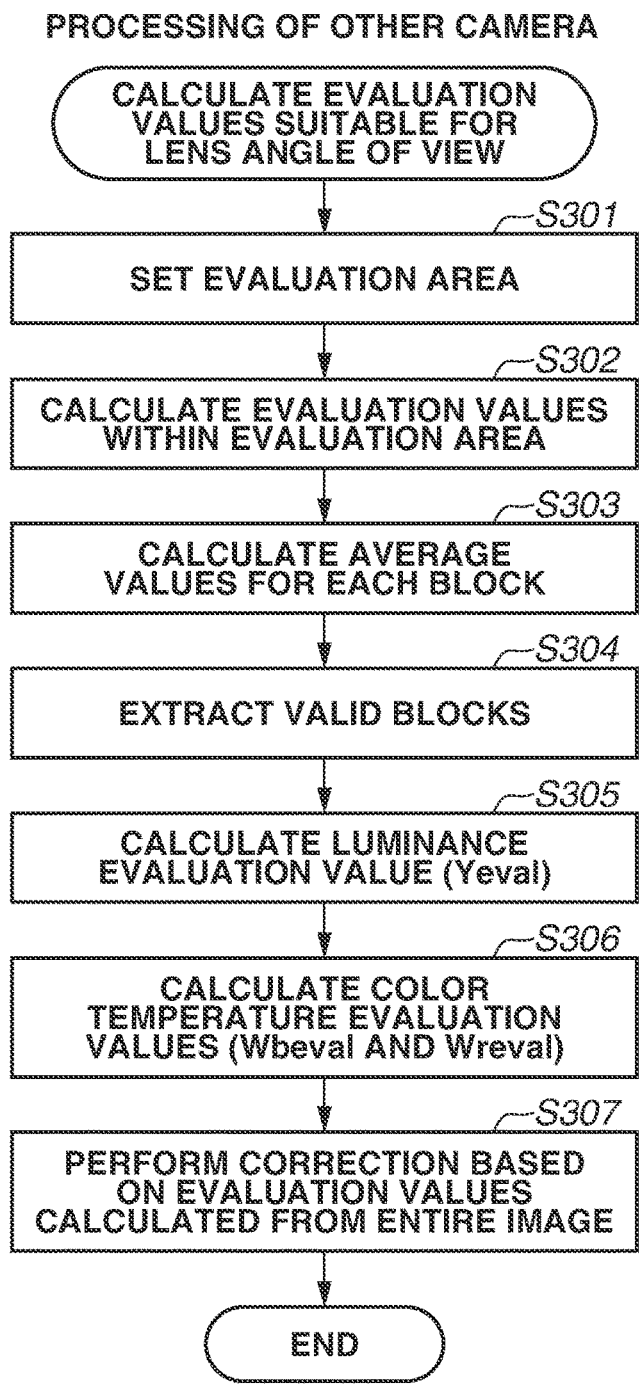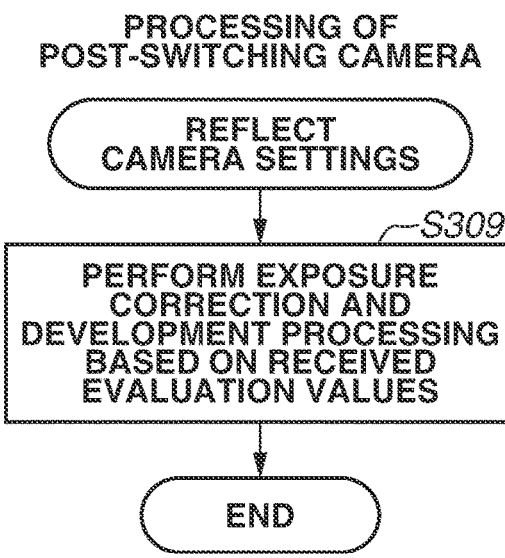

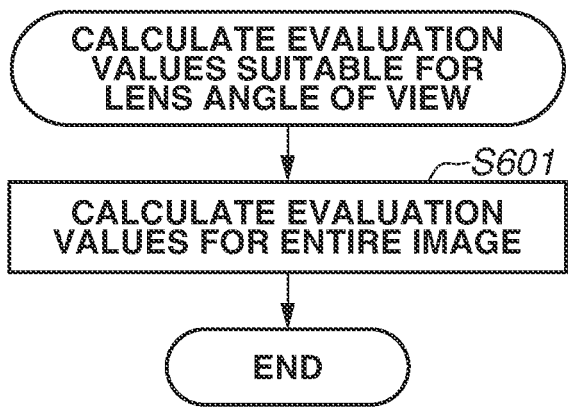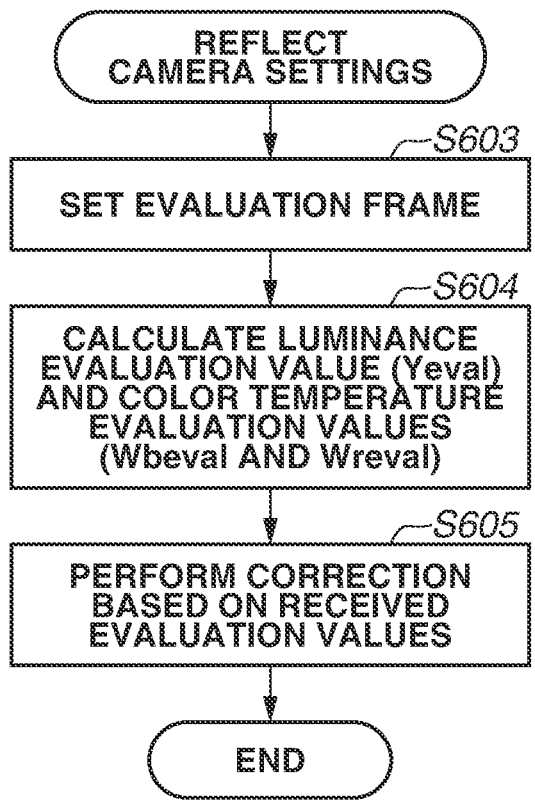

IMAGING APPARATUS AND METHOD FOR CONTROLLING THE SAME

BACKGROUND

Field of the Disclosure

The present disclosure generally relates to an imaging apparatus and a method for controlling the same, and in particular to an imaging apparatus and a method for controlling the same for sharing settings and evaluation values for image capturing between a plurality of cameras.

Description of the Related Art

For an event, such as an athletic meet, a photographer (hereinafter referred to as "user") captures images while switching between a plurality of cameras varying in lens angle of view (e.g., two cameras, one for standard zoom and the other for telephoto zoom) in some cases. In such a situation, captured images may vary in luminance or color tone, due to the difference in camera settings or methods for calculating evaluation values for image capturing (e.g., an exposure correction value and a coefficient for white balance processing).

To address such an issue, Japanese Patent Application Laid-Open No. 2007-266781 discusses a technique in which an average value between an evaluation value acquired by a camera and an evaluation value received from another camera among a plurality of cameras is calculated, so that an evaluation value to be used is shared by the entire image capturing system. In addition, Japanese Patent Application Laid-Open No. 2010-21920 discusses the following technique. In a case where the user changes an imaging apparatus to another imaging apparatus to capture an image, when an object recorded beforehand is detected by the imaging apparatus that is used after the change, the imaging apparatus that is used before the change transmits image capturing settings associated with this object to the imaging apparatus that is used after the change.

In the technique discussed in Japanese Patent Application Laid-Open No. 2007-266781, a common evaluation value, e.g., the average value between the evaluation values acquired from the plurality of cameras is used. Thus, in a case where the angles of view of lenses attached to the respective cameras are different, an effect decreases due to a difference in the distribution of high luminance objects or the proportion of white area in an image. In the technique discussed in Japanese Patent Application Laid-Open No. 2010-21920, the image capturing settings are not acquired before the recorded object is detected by the imaging apparatus that is used after the camera change. Moreover, this technique is based on a premise that the imaging apparatus that is used before the change and the imaging apparatus that is used after the change are installed so that both imaging apparatuses perform image capturing with the same angle of view. Thus, a change in the angle of view before and after the change is not considered. Accordingly, in a case where a change in the angle of view occurs, the image capturing settings may be inappropriate.

SUMMARY

The present disclosure is directed to a technique for making image capturing settings appropriate to each of a plurality of cameras varying in condition, such as an image capturing angle of view, while reducing the work required for individually making image capturing settings for each of the cameras, in capturing images using the cameras.

According to an aspect of the present disclosure, a method for controlling a plurality of imaging apparatuses capable of communicating with each other includes acquiring information about an image capturing angle of view of each of the plurality of imaging apparatuses, and determining an image capturing parameter to be used when one imaging apparatus among the plurality of imaging apparatuses shifts to a use state, based on information about an image capturing parameter or evaluation value in an other imaging apparatus, and an image capturing angle of view of each of the other imaging apparatus and the one imaging apparatus.

Further features of the present disclosure will become apparent from the following description of exemplary embodiments with reference to the attached drawings.

BRIEF DESCRIPTION OF THE DRAWINGS

FIG. 1 is a block diagram illustrating a configuration example of an imaging apparatus according to an exemplary embodiment.

FIGS. 3A and 3B are flowcharts each illustrating evaluation value calculation in a case of switching from a wide-angle camera to a telephoto camera according to a first exemplary embodiment.

FIGS. 6A and 6B are flowcharts illustrating evaluation value calculation in a case of switching from the telephoto camera to the wide-angle camera according to the first exemplary embodiment.

DESCRIPTION OF THE EMBODIMENTS

Figure 2A:
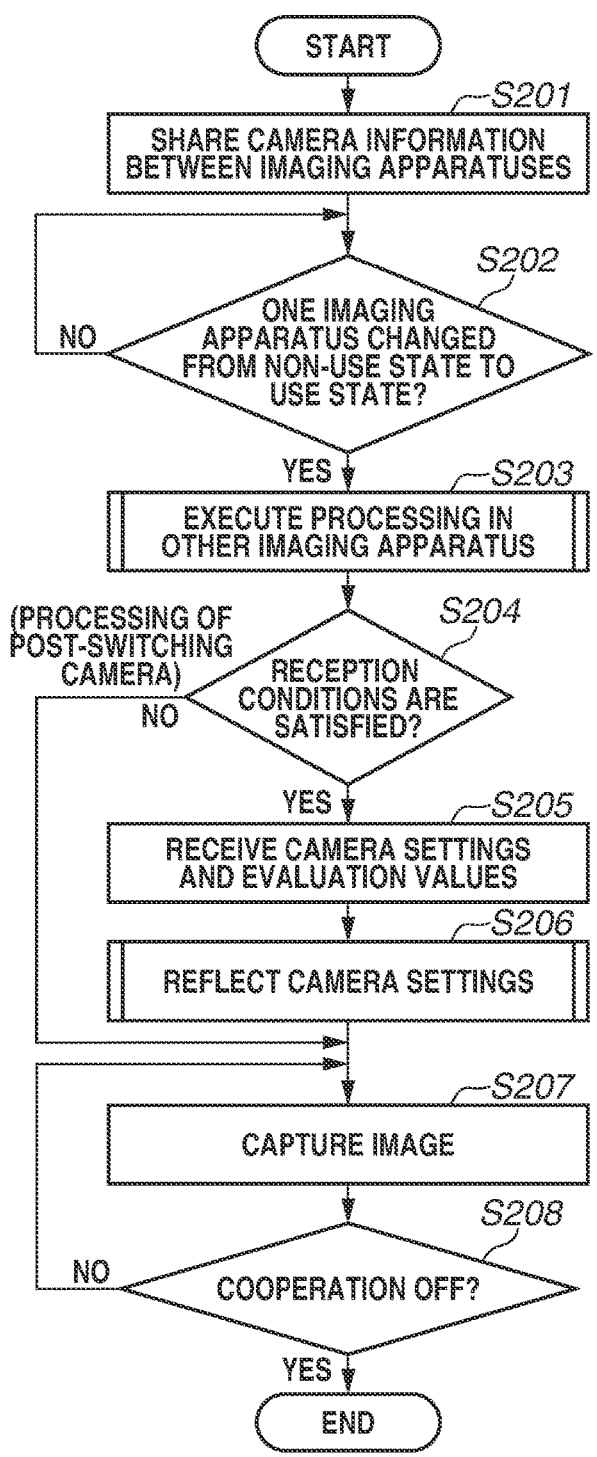
FIGS. 2A and 2B are flowcharts each illustrating an example of control processing for switching between a plurality of cameras according to an exemplary embodiment.

An exemplary embodiment of the present disclosure will be described in detail below with reference to the accompanying drawings.

It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

A case where a digital camera is used as an imaging apparatus will be described below as an example. Components having the same functions are assigned the same numbers in the accompanying drawings, and the descriptions thereof are not repeated.

FIG. 1 is a block diagram illustrating a configuration example of an imaging apparatus according to an exemplary embodiment of the present disclosure. This configuration example is illustrative, and the present disclosure is not limited to the present exemplary embodiment and is modified based on a circuit structure where appropriate when applied.

An imaging apparatus 100 is, for example, a digital camera.

An imaging lens unit 101 is a lens unit including at least a focus lens, and may be a configuration including other optical systems, such as a zoom lens. A diaphragm 102 is used to adjust the quantity of incident light from the imaging lens unit 101. In the present exemplary embodiment, the imaging lens unit 101 is fastened to the main body of the imaging apparatus 100, but may be an interchangeable lens that can be attachable to and detachable from the imaging apparatus 100. In such a case, the diaphragm 102 is included inside the interchangeable lens.

An imaging unit 103 includes an image sensor, such as a complementary metal oxide semiconductor (CMOS) sensor, for converting the incident light from the imaging lens unit 101 into an electrical signal. The imaging unit 103 further includes an analog-to-digital (A/D) converter for converting an analog signal output from the image sensor into a digital signal.

An internal memory 104 is a storage device for temporarily holding the digital signal (raw image data) output from the imaging unit 103 and post-development image data generated by an image processing unit 109. The internal memory 104 is configured of a volatile memory, such as a dynamic random access memory (DRAM).

A communication unit 105 is used for transmitting and receive information, such as lens information, camera settings, and evaluation values for image capturing, to and from other cameras via a network. The communication unit 105 can also communicate with an external server or personal computer (PC), and thus can transmit and receive image data and operation signals to and from an external apparatus, in addition to the above-described information, such as lens information and camera settings.

An operation input unit 106 is used for a photographer (a user) to provide, to the camera, various operation instructions, such as an instruction to set an image capturing conditions and an instruction to display post-development image data. The operation input unit 106 includes buttons, an electronic dial, and a touch panel.

A switching detection unit 107 detects whether the camera is in a state where the user is using the camera (hereinafter, referred to as "use state" or in a state where the user is not using the camera (hereinafter, referred to as "non-use state"). This detection is based on a result of detection by a grip (not illustrated) holding detector, a result of detection by an eye detector for detecting the presence of an eye (object) in proximity to a viewfinder, and an operation on the operation input unit 106 including a release button and a lens driving button.

An evaluation value calculation unit 108 calculates evaluation values, for example, an exposure correction value and a color temperature evaluation value for white balance (WB) processing, based on the raw image data held in the internal memory 104. The evaluation value calculation unit 108 corrects the calculated evaluation values, based on lens information and evaluation values from another camera received via the communication unit 105.

The image processing unit 109 performs development processing on the raw image data output from the imaging unit 103, using the evaluation values calculated by the evaluation value calculation unit 108. The development processing includes WB correction processing, noise reduction (NR) processing, sharpness processing, and optical aberration correction processing. The image data having been subjected to the development processing is displayed as a live view image on a display unit (not illustrated), and is also stored into a storage unit, such as an external memory 112 (described below), in response to, for example, an imaging instruction from the user.

A central processing unit (CPU) 110 is connected to each control block via a transmission path (a bus), and controls the entire imaging apparatus 100. The CPU 110 includes memories (not illustrated) including a read only memory (ROM) and a random access memory (RAM). The CPU 110 controls each function block of the imaging apparatus 100 and performs an operation therefor, based on a program loaded from the ROM. The ROM stores a control program to be executed by the CPU 110, and various constant values for program execution. The RAM is an area for storing various types of temporary data for program execution.

An external memory control unit 111 controls the writing of the raw image data and the post-development image data held in the internal memory 104 into the external memory 112, and the reading of the data held in the external memory 112 into the internal memory 104.

The external memory 112 is, for example, a storage device, such as a Secure Digital (SD) card, attachable to and detachable from the imaging apparatus 100, and is configured of a nonvolatile memory, such as a flash memory. The external memory 112 can record the raw image data captured by the imaging unit 103 and the image data having been subjected to the development processing by the image processing unit 109.

Basic operations of the imaging apparatus 100 will be described below. For example, when the user turns on the power by operating the operation input unit 106, the imaging apparatus 100 shifts to an image capturing standby state. In the image capturing standby state, the imaging apparatus 100 develops the digital signal (the raw image data) acquired from the imaging unit 103, and displays a live view image on the display unit (not illustrated), based on the developed digital signal.

Subsequently, in response to an image capturing preparation instruction provided by a user operation, the image processing unit 109 calculates image capturing parameters suitable for an object, based on automatic focus (AF), automatic exposure (AE), and automatic white balance (AWB) functions. Further, upon receipt of an image capturing instruction, the imaging apparatus 100 records an object image in the external memory 112 as image data having been subjected to the development processing. Furthermore, in response to an image capturing instruction and an image capturing stop instruction for a moving image, the imaging apparatus 100 records image data obtained by imaging during the period between these instructions, as moving image data.

In addition, the imaging apparatus 100 is capable of communicating with an external network, an external apparatus, and another imaging apparatus via the communication unit 105, and thus can transmit and receive data, such as images and image capturing settings, thereto and therefrom.

Figure 2B:
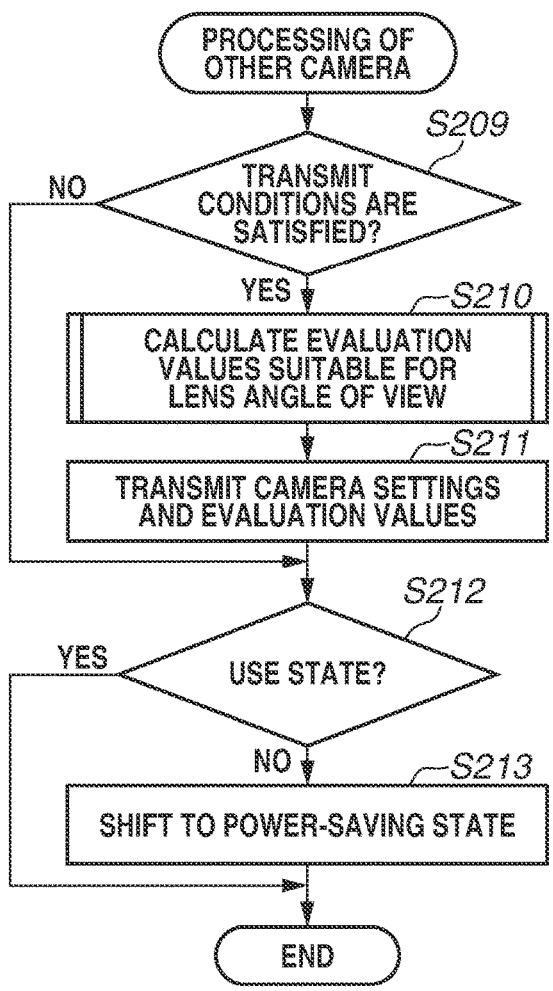

A first exemplary embodiment of the present disclosure will be described below. Processing for controlling evaluation value calculation in switching between the cameras according to the present exemplary embodiment will be described below with reference to FIGS. 2A and 2B. FIGS. 2A and 2B are flowcharts illustrating an example processing for controlling switching between the plurality of cameras according to the present exemplary embodiment. The CPU 110 executes a processing procedure illustrated in each of FIGS. 2A and 2B by controlling each processing block. The CPU 110 loads the program stored in the ROM (not illustrated) into the RAM, and executes the loaded program, to implement the processing procedure.

An example to be described below according to the first exemplary embodiment is a situation where the user captures images while switching between an imaging apparatus to which a wide-angle lens with a fixed focal length is attached and an imaging apparatus to which a telephoto lens with a fixed focal length is attached. The flowchart in FIG. 2A starts when, for example, setting for capturing images while switching between the plurality of imaging apparatuses 100 (a cooperation mode) is executed.

When image-capturing using the plurality of imaging apparatuses 100 begins, in step S201, the imaging apparatuses 100 communicate with each other via the respective communication units 105, and share camera information including each other's angles of view.

In step S202, the imaging apparatuses 100 each determine whether the imaging apparatus 100 is changed from the non-use state to the use state, using the respective switching detection unit 107. A possible method for the determination is, for example, to make the determination based on a result of each of detection (A) to detection (D), described below, or a combination thereof. A state where the imaging apparatus 100 is not operated (used) is referred to as the non-use state. The imaging apparatus 100 determines that the imaging apparatus 100 is in the non-use state, for example, in a case where nothing is detected in detection (A) to detection (C), or a case where a result of detection (D) remains unchanged for a fixed period. The imaging apparatus 100 determines that the imaging apparatus 100 is in the use state, for example, in a case where detection (A) to detection (D) are executed at predetermined intervals in the non-use state, and at least one of (A) to (C) is detected or the result of detection (D) has changed. This determination method is illustrative, and the determination may be made based on any combination, or may be made based on other conditions, if the use state and non-use state of the imaging apparatus 100 can be determined.

(A) The detection of the holding of the grip (B) The detection of an eye looking into a viewfinder (C) The detection of an operation on the camera, such as an image capturing preparation instruction, (SW1), an image capturing instruction (SW2), and zooming (D) The detection of a tilt of the camera or lens Here, among the plurality of imaging apparatuses 100, the one imaging apparatus 100 changed from the non-use state to the use state will be referred to as "post-switching imaging apparatus (camera)", and any of the imaging apparatuses 100 except for the post-switching imaging apparatus will be referred to as "other imaging apparatus (camera)". If it is determined that the imaging apparatus 100 is changed to the use state (YES in step S202), the processing proceeds to step S203. If it is determined that the imaging apparatus 100 is not changed to the use state, i.e., switching between the imaging apparatuses has not occurred (NO in step S202), the operation in step S202 is repeated.

If the post-switching imaging apparatus (camera) is changed to the use state in step S202, the other imaging apparatus (camera) is notified of this determination, and, in step S203, processing in the other imaging apparatus (camera) is executed. In this processing, the cameras (the imaging apparatuses 100) communicate information including position information, an image capturing direction, an image captured last, and an object detection result regarding the respective imaging apparatus 100 to each other. These pieces of information can each be acquired using a conventional technique. For example, the position information is acquired by receiving Global Positioning System (GPS) information using a GPS function (not illustrated) of the imaging apparatus 100. The processing of the other imaging apparatus (camera) will be described with reference to the flowchart in FIG. 2B.

Next, operations in subsequent steps (step S204 to step S207) in the processing of the post-switching imaging apparatus will be described below.

In step S204, the CPU 110 determines whether to receive camera settings and evaluation values from the other imaging apparatus used immediately before (the pre-switching imaging apparatus). A method for this determination uses, for example, the following conditions (a) to (d).

(a) The elapsed time from the time of the last image capturing in the pre-switching imaging apparatus (the other imaging apparatus) falls within a fixed period.

(b) The position of the pre-switching imaging apparatus (the other imaging apparatus) in the last image capturing is the same as the position of the post-switching imaging apparatus.

(c) The image capturing direction of the pre-switching imaging apparatus (the other imaging apparatus) in the last image capturing is the same as the image capturing direction of the post-switching imaging apparatus.

(d) A person in the image captured last in the pre-switching imaging apparatus (the other imaging apparatus) is detected in an image acquired by the post-switching imaging apparatus.

In a case where the condition (a) and at least one of the conditions (b) to (d) are satisfied, it is deemed that the same scene is captured by the user, and the CPU 110 determines that reception conditions are satisfied (YES in step S204). The more the conditions are satisfied, the more likely the same scene is captured. If the CPU 110 determines YES, in step S204, the processing proceeds to step S205. If the reception conditions are not satisfied (NO in step S204), the processing proceeds to step S207.

In step S205, the CPU 110 requests the pre-switching imaging apparatus (the other camera) to provide the camera settings and the evaluation values, and receives the camera settings and evaluation values. Here, the camera settings are parameters including a resolution of an image, an AF mode setting (e.g., a one-shot mode, a track mode, or a pupil AF mode), an image capturing mode (e.g., an aperture priority mode, a shutter speed priority mode, a program transition mode, or a manual mode). For example, the user may make the camera settings beforehand using the operation input unit 106. The evaluation values are parameters, such as the exposure correction value and the coefficient for white balance processing, which are automatically calculated by the evaluation value calculation unit 108 in the imaging apparatus 100, based on the captured scene.

In step S206, the CPU 110 reflects the camera settings received from the other imaging apparatus, and calculates the evaluation values to be used in the post-switching imaging apparatus, based on the received evaluation values.

In step S207, the CPU 110 determines image capturing conditions, such as an aperture value, an International Organization for Standardization (ISO) sensitivity, and a shutter speed, based on the exposure correction value calculated in step S206, and performs image capturing. Further, the imaging apparatus 100 performs the development processing using the coefficient for white balance processing calculated in step S206, for the raw image data obtained by image capturing, and saves the image data after the development in the external memory 112.

In step S208, the CPU 110 determines whether cooperation between the plurality of imaging apparatuses 100 is off. In a case where the cooperation mode is disabled, a case where the post-switching imaging apparatus is powered off, or a case where all the other imaging apparatuses are powered off, the CPU 110 determines that the cooperation is turned off (YES in step S208), and the processing ends. If the CPU 110 determines that the cooperation is not turned off (NO in step S208), the processing returns to the stage immediately before step S207, and repeats the steps thereafter.

The processing of the other imaging apparatus as illustrated in FIG. 2B will be described below.

In step S209, the CPU 110 determines whether to transmit the camera settings and the evaluation values of the other imaging apparatus (camera) to the post-switching imaging apparatus (camera). For example, this determination is made based on whether the condition (a) and at least one of the conditions (b) to (d) are satisfied, as in step S204. If the CPU 110 determines to transmit the camera settings and the evaluation values (YES in step S209), i.e., if the transmission conditions are satisfied, the processing proceeds to step S210. If the CPU 110 determines not to transmit the camera settings and the evaluation values (NO in step S209), i.e., if the transmission conditions are not satisfied, the processing ends.

In step S210, the CPU 110 calculates the evaluation values suitable for the lens angle of view of the post-switching imaging apparatus. The CPU 110 calculates the evaluation values, using, for example, the raw image data of the image captured last in the other imaging apparatus and the camera information shared in step S201. A specific method will be described below with reference to FIGS. 3A and 3B.

In step S211, the CPU 110 transmits the camera settings and the evaluation values calculated in step S210 to the post-switching imaging apparatus (camera).

In step S212, the CPU 110 determines whether the other imaging apparatus (camera) itself that performs this flowchart is in the use state, using the switching detection unit 107, in a manner similar to step S202, for example. If it is determined that the other imaging apparatus (camera) is in the use state (YES in step S212), this flowchart ends. If the other imaging apparatus (camera) is not in the use state (NO in step S212), the processing proceeds to step S213.

In step S213, the other imaging apparatus (camera) in the non-use state shifts to a power-saving state, and this flowchart ends.

Next, processing for the above-described evaluation value calculation (step S206 in FIG. 2A, and step S210 in FIG. 2B) based on the lens angle of view will be described in detail below. Details of processing varies depending on the magnitude correlation between the angle of view of the lens attached to the pre-switching imaging apparatus and the angle of view of the lens attached to the post-switching imaging apparatus. A case of switching from wide-angle to telephoto and a case of switching from telephoto to wide-angle will each be described below.

(Case of Switching from Wide-Angle to Telephoto)

Initially, processing of the evaluation value calculation in a case of switching from the camera with the wide-angle lens attached thereto to the camera with the telephoto lens attached thereto will be described with reference to FIGS. 3A and 3B. FIGS. 3A and 3B are flowcharts illustrating the evaluation value calculation in the case of switching from the wide-angle camera to the telephoto camera according to the first exemplary embodiment of the present disclosure.

The CPU 110 executes a processing procedure illustrated in each of FIGS. 3A and 3B while controlling each processing block. The CPU 110 loads the program stored in the ROM (not illustrated) into the RAM, and executes the loaded program to implement the processing procedure.

First, the processing for the calculation of the evaluation value based on the lens angle of view in the pre-switching camera (wide-angle) in step S210 described above will be described with reference to FIG. 3A.

Figure 4:
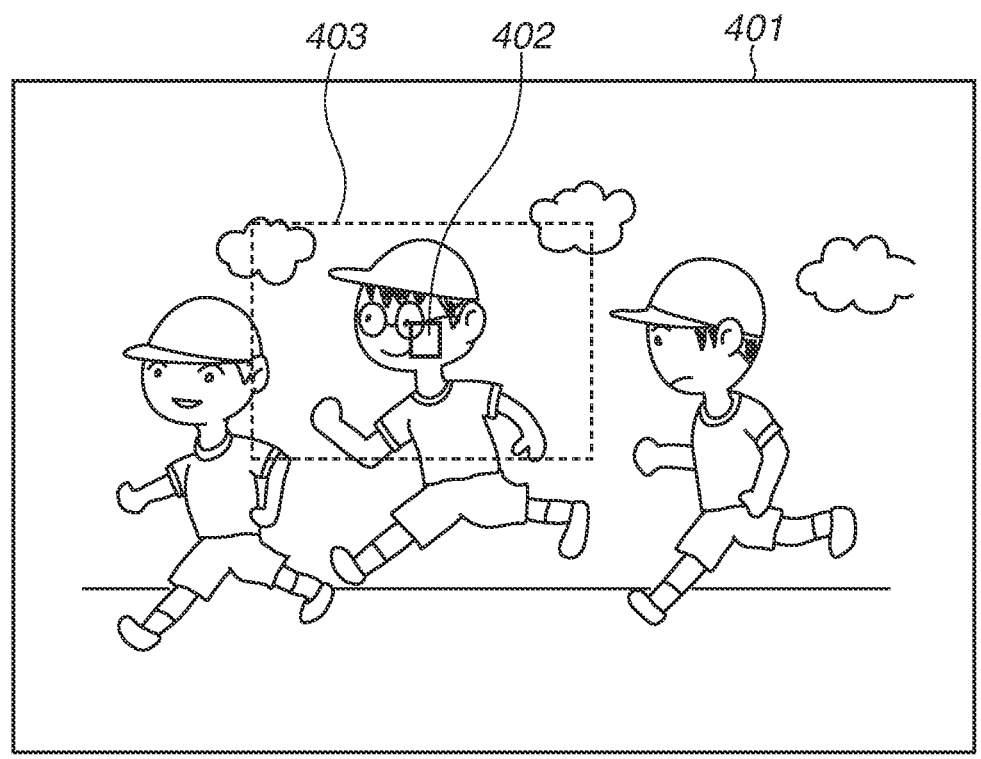
FIG. 4 is a diagram illustrating an example of evaluation area setting according to the first exemplary embodiment.

In step S301, for the entire image captured by the pre-switching camera (wide-angle), the CPU 110 sets an evaluation area corresponding to the lens angle of view of the post-switching camera (telephoto), with an in-focus position (a focus position) within the image as the center of the evaluation area. In the case of switching from wide-angle to telephoto, the image capturing angle of view of the post-switching imaging apparatus is smaller than the image capturing angle of view of the pre-switching imaging apparatus. Here, FIG. 4 illustrates an example of evaluation area setting according to the first exemplary embodiment of the present disclosure. For an entire image 401 captured by the wide-angle camera, an area surrounded by a dotted line in FIG. 4, with an in-focus position 402 (the focus position) as the center of the area, is set as an evaluation area 403.

In step S302, the CPU 110 calculates a luminance value (Y) and color temperature evaluation values (Cx and Cy) at each pixel position of the evaluation area, using the following equations, respectively.

$$Y = 3*R + 6*G + 1*B \quad (1)$$

$$Cx = (R-B)/Y \quad (2)$$

$$Cy = (R+B+2*G)/Y \quad (3)$$

Figure 5:
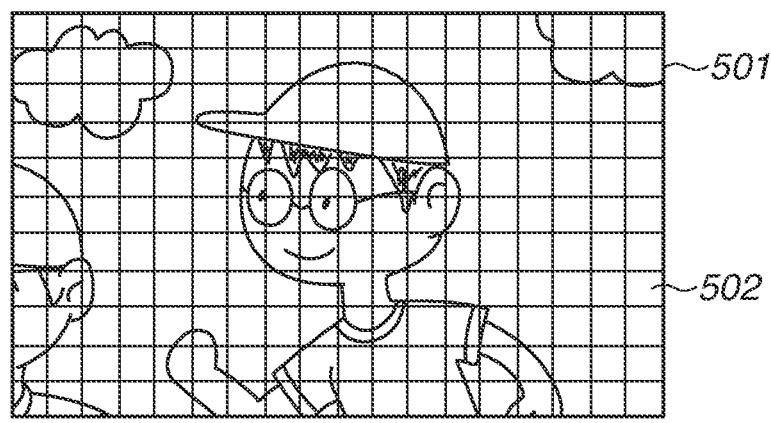
FIG. 5 is a diagram illustrating an example of division of an evaluation area into blocks according to the first exemplary embodiment.

In step S303, the CPU 110 calculates average values (Yave, Cxave, and Cyave) for the values Y, Cx, and Cy, respectively, for each block. FIG. 5 is a diagram illustrating an example of division of an evaluation area into blocks according to the first exemplary embodiment of the present disclosure. In step S303, the CPU 110 divides an evaluation area 501 into a plurality of blocks 502 as illustrated in FIG. 5, and calculates the evaluation values.

In step S304, the CPU 110 then extracts a valid block (Yval) for luminance evaluation and valid blocks (Cxval and Cyval) for color temperature evaluation in the evaluation area, using the average values (Yave, Cxave, and Cyave) of the values Y, Cx, and Cy of each block, calculated in step S303. The valid block (Yval) for luminance evaluation is an area excluding a high-luminance portion and a low-luminance portion within the evaluation area, and is extracted based on the following inequality (4), using a high luminance side threshold (Ymax) and a low luminance side threshold (Ymin).

$$Y\min \leq Y\text{ave} < Y\max \quad (4)$$

Each of the valid blocks (Cxval and Cyval) for color temperature evaluation belongs to a white area within the image, and is determined based on whether the corresponding one of the average values (Cxave and Cyave) falls within a predetermined range. Assuming that each of Cxmin and Cymin is an upper limit of the white area and each of Cxmax and Cymax is a lower limit of the white area, the valid blocks for color temperature evaluation are extracted based on the following inequalities (5) and (6).

$$Cx\min \leq Cx\text{ave} < Cx\max \quad (5)$$

$$Cy\min \leq Cy\text{ave} < Cy\max \quad (6)$$

In step S305, the CPU 110 calculates a luminance evaluation value (Yeval) using the following equation (7), with respect to the valid block (Yval) for luminance evaluation, extracted in step S304.

$$Yeval = \frac{1}{N}\sum_{n=1}^{N}(Yval[n]) \qquad (7)$$

In equation (7), N is the number of the valid blocks.

Further, in step S306, the CPU 110 calculates average values (Reval, Geval, and Beval) of respective R, G, and B signals, using the following equations (8) to (10), for the valid blocks for color temperature evaluation.

$$Reval = \frac{1}{N}\sum_{n=1}^{N}(Rval[n]) \qquad (8)$$

$$Geval = \frac{1}{N}\sum_{n=1}^{N}(Gval[n]) \qquad (9)$$

$$Beval = \frac{1}{N}\sum_{n=1}^{N}(Bval[n]) \qquad (10)$$

Using the calculated average values, the CPU 110 calculates color temperature evaluation values (Wbeval and Wreval) based on the following equations.

$$Wbeval = Geval/Beval \qquad (11)$$

$$Wreval = Geval/Reval \qquad (12)$$

In step S307, the CPU 110 then corrects the luminance evaluation value (Yeval) calculated in step S305, and the color temperature evaluation values (Wbeval and Wreval) calculated in step S306. The CPU 110 compares the corrected evaluation values with a luminance evaluation value (Yall) and color temperature evaluation values (Wball and Wrall) calculated from the entire frame of the captured image, and further corrects the evaluation values, using the following equations.

$$Yref = (Yall - Yeval)*Ky + Yeval \qquad (13)$$

$$Wbref = (Wball/Wbeval - 1)*Kwb + Wbeval \qquad (14)$$

$$Wrref = (Wrall/Wreval - 1)*Kwr + Wreval \qquad (15)$$

Here, Ky is a correction coefficient for the luminance evaluation value, and Kwb and Kwr are each a correction coefficient for the color temperature evaluation value. A unique value in a range from 0 to 1 is set to each of these correction coefficients, based on the difference in the lens angle of view. For example, each of the correction coefficients (Ky, Kwb, and Kwr) is brought closer to one' for a smaller difference in the lens angle of view between the pre-switching camera and the post-switching camera, based on the result of the comparison. Thus, the weight of the evaluation value (a predicted value) calculated in the pre-switching camera is increased. On the other hand, each of the correction coefficients (Ky, Kwb, and Kwr) is brought closer to zero for a smaller difference in the lens angle of view. Thus, the weight of the evaluation value (a predicted value) calculated in the post-switching camera is increased.

This ends the description of the processing (step S209 in FIG. 2B) for the evaluation value calculation in the pre-switching camera. After the completion of this flowchart, the processing returns to the flowchart in FIG. 2B.

In step S211, the CPU 110 transmits the luminance evaluation value (Yref) and the color temperature evaluation values (Wbref and Wrref) corrected in step S307 to the post-switching camera (telephoto).

FIG. 3B illustrates the processing (step S206 in FIG. 2A) in the post-switching camera (telephoto). In the case of switching from the wide-angle camera to the telephoto camera, in step S309, the CPU 110 performs exposure correction, using the luminance evaluation value (Yref) received from the pre-switching camera, without a change, as a target average luminance value. Further, the CPU 110 performs the development processing, using the received color temperature evaluation values (Wbref and Wrref), without a change, as the coefficient for white balance. Thus, luminance and color tone similar to those of the image captured by the pre-switching camera can be obtained.

(Case of Switching from Telephoto to Wide-Angle)

Next, a calculation and correction method in a case of switching from the camera with the telephoto lens attached thereto to the camera with the wide-angle lens attached thereto will be described with reference to FIGS. 6A and 6B. FIGS. 6A and 6B are flowcharts illustrating the evaluation value calculation in the case of switching from the telephoto camera to the wide-angle camera according to the first exemplary embodiment of the present disclosure. The CPU 110 executes a processing procedure illustrated in each of FIGS. 6A and 6B by controlling each processing block. The CPU 110 loads the program stored in the ROM into the RAM, not illustrated, and executes the loaded program to implement the processing procedure.

In FIG. 6A, at first, in step S601, the CPU 110 calculates the evaluation values for the entire area of the image captured last by the pre-switching camera (telephoto) through processes similar to those in step S302 to step S306 in FIG. 3A. The CPU 110 calculates, for example, values such as the luminance evaluation value (Yall) and the color temperature evaluation values (Wball and Wrall), as the evaluation values. The processing then returns to the flowchart in FIG. 2B.

In step S211 of the flowchart in FIG. 2B, the CPU 110 transmits the luminance evaluation value (Yall) and the color temperature evaluation values (Wball and Wrall) calculated in step S601 to the post-switching camera (wide-angle).

FIG. 6B illustrates the processing (corresponding to step S206 in FIG. 2A) in the post-switching camera (wide-angle). In step S603, the CPU 110 sets an evaluation frame. More specifically, the CPU 110 sets an area corresponding to the lens angle of view of the pre-switching camera (telephoto) as the evaluation frame, with a main object of the image captured by the post-switching camera (wide-angle) as the center of the evaluation frame.

In step S604, the CPU 110 then calculates the evaluation values, such as the luminance evaluation value (Yeval) and the color temperature evaluation values (Wbeval and Wreval) corresponding to the evaluation frame set in step S603 through processes similar to those in step S302 to step S306.

In step S605, the CPU 110 then corrects the calculated evaluation values based on the following equations (16) to (18), using the received evaluation values of the pre-switching camera (telephoto) through process similar to that in step S307 in FIG. 3A.

$$Yref = (Yall - Yeval)*Ky + Yeval \qquad (16)$$

$$Wbref = (Wball/Wbeval - 1)*Kwb + Wbeval \qquad (17)$$

$$Wrref = (Wrall/Wreval - 1)*Kwr + Wreval \qquad (18)$$

Here, Ky, Kwb, and Kwr are correction coefficients each of which takes a value in a range from 0 to 1. The same values as those used in the expressions (13) to (15) may be used.

The processing then proceeds to step S207 in FIG. 2A, and the CPU 110 performs the exposure correction using the corrected luminance evaluation value (Yref) as the target average luminance value. Further, the CPU 110 performs the development processing using the corrected color temperature evaluation values (Wbref and Wrref) as the coefficients for white balance, so that the post-switching camera obtains an image of luminance and color tone similar to those of the image captured by the pre-switching camera.

As described above, according to the first exemplary embodiment of the present disclosure, the imaging apparatus 100 detects switching, and corrects the evaluation values for image capturing, depending on the difference between the angles of view of lenses attached to the respective cameras. This enables the user to obtain a captured image with small differences in color tone and luminance, without adjusting the camera settings individually.

A second exemplary embodiment of the present disclosure will be described below. In the present exemplary embodiment, a method for calculating evaluation values in a case where a focal length variable lens (hereinafter referred to as "zoom lens") is used will be described. In the first exemplary embodiment, the size of the evaluation area is uniquely determined because the focal length of each of the wide-angle lens and the telephoto lens is fixed. In the second exemplary embodiment, a case will be described, as an example, where, if the focal length continually changes as in the zoom lens, the focal length is divided into a plurality of points, and an evaluation area that varies in size for each point is set.

A configuration for implementing the second exemplary embodiment is similar to that of the first exemplary embodiment. However, in the present exemplary embodiment, when the processing proceeds to step S203 to execute the processing in the other camera in FIG. 2A, the plurality of cameras communicate information about the current focal length (the angle of view) to each other. In addition, the evaluation value calculation processing in step S301 to step S307 of the processing illustrated in FIG. 3A is executed using a plurality of evaluation frame sizes.

Figure 7:
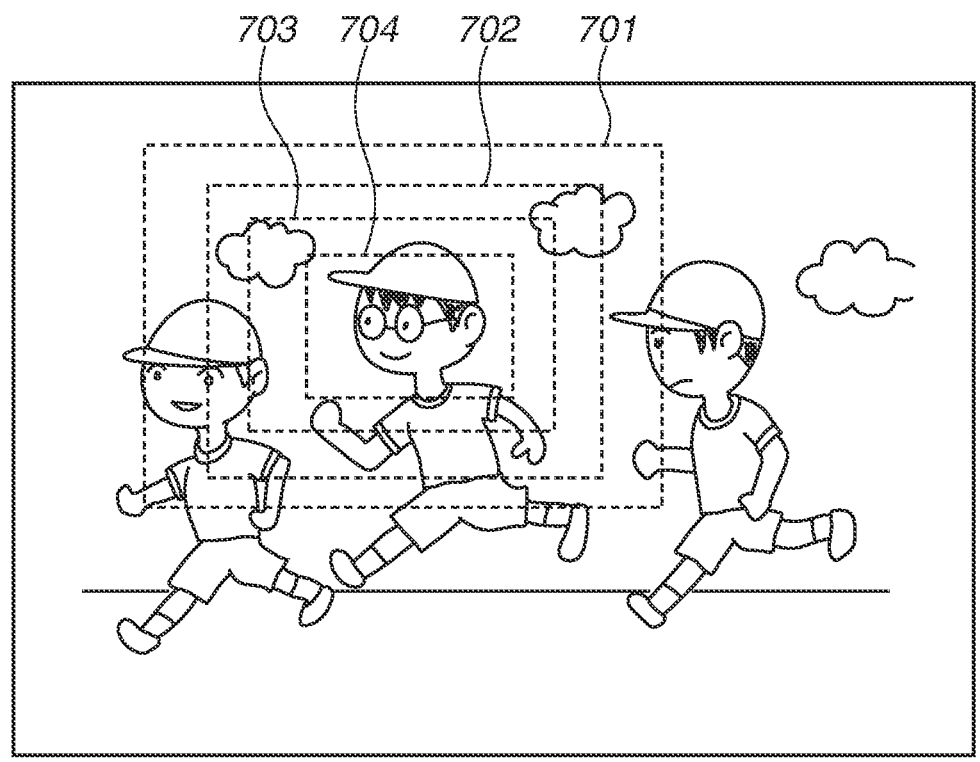
FIG. 7 is a diagram illustrating an example of evaluation area setting based on an angle of view of a zoom lens according to a second exemplary embodiment.

FIG. 7 is a diagram illustrating an example of evaluation area setting based on the angle of view of the zoom lens according to the second exemplary embodiment of the present disclosure. FIG. 7 illustrates, as an example, a case where individual evaluation area is set in a case where the evaluation values are calculated for each of points, i.e., focal lengths of 24 mm, 35 mm, 50 mm, and 70 mm of the zoom lens (24 mm to 70 mm). An evaluation area 701 corresponds to the focal length of 24 mm, an evaluation area 702 corresponds to the focal length of 35 mm, an evaluation area 703 corresponds to the focal length of 50 mm, and an evaluation area 704 corresponds to the focal length of 70 mm.

The shorter the focal length is, the larger the image capturing angle is and thus the larger the evaluation frame size is.

As described above, according to the present exemplary embodiment, the evaluation values calculated from the evaluation area corresponding to the shortest focal length are selected from the received evaluation values based on the focal length to be used by the post-switching camera, and the selected evaluation values are used, so that the evaluation values corresponding to the zoom lens can be shared. A configuration may be adopted in which parameters in an area corresponding to the focal length (the angle of view) of the post-switching camera are acquired in step S301 to step S307 in the other camera, based on the information about the focal length (the angle of view) acquired in step S203.

A third exemplary embodiment of the present disclosure will be described below. In the first and second exemplary embodiments, the camera itself automatically determines whether to transmit and receive the camera settings and the evaluation values to and from the other camera. In the third exemplary embodiment, a description will be provided of a method for controlling the transmission and reception by the user inputting operations.

Basic processing for implementation is similar to those of the first and second exemplary embodiments, but step S204 in FIG. 2A is different. Specifically, whether to receive the camera settings and the evaluation values is determined, in step S204 in FIG. 2A, based on an operation input by the user.

This enables the user to determine whether to keep using the settings and the evaluation values of the pre-switching camera in the post-switching camera.

As described above, according to the exemplary embodiments of the present disclosure, even in a case where the user captures images while switching between the plurality of cameras having different lens angle of view, captured images with small differences in luminance and color tone between the cameras can be obtained.

Switching between the two cameras is described above, but the present disclosure is also applicable to a case where three or more cameras are used.

While some exemplary embodiments of the present disclosure are described above, the present disclosure is not limited thereto, and is modified to be adapted where appropriate depending on a target circuit configuration, within the scope of the technical ideas of the present disclosure. For example, the imaging apparatus described above in each of the exemplary embodiments is applicable to a digital still camera and a digital video camera.

According to each of the exemplary embodiments of the present disclosure, it is possible to make the image capturing settings appropriate to each of the cameras with different conditions, such as the image capturing angle, while reducing work for making the image capturing settings for each of the cameras individually, in capturing images with the plurality of cameras.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-113204, filed Jun. 18, 2019, which is hereby incorporated by reference herein in its entirety.

What is claimed is:

1. A method for controlling a plurality of imaging apparatuses capable of communicating with each other, the method comprising:
    acquiring information about an image capturing angle of view of each of the plurality of imaging apparatuses; and
    determining an image capturing parameter to be used when one imaging apparatus among the plurality of imaging apparatuses shifts to a use state, based on information about an image capturing parameter or evaluation value in an other imaging apparatus, and an image capturing angle of view of each of the other imaging apparatus and the one imaging apparatus.

2. The method according to claim 1, wherein the determining is performed by either the one imaging apparatus or the other imaging apparatus.

3. The method according to claim 1, wherein, in the determining, the image capturing parameter is determined based on an area, within a predetermine range, corresponding to the image capturing angle of view of the one imaging apparatus with a focus position in an image captured by the other imaging apparatus as a center, in a case where the image capturing angle of view of the one imaging apparatus is smaller than the image capturing angle of view of the other imaging apparatus.

4. The method according to claim 1, wherein, in the determining, the image capturing parameter is determined based on an entire image captured by the other imaging apparatus in a case where the image capturing angle of view of the one imaging apparatus is larger than the image capturing angle of view of the other imaging apparatus.

5. The method according to claim 1, further comprising determining whether the one imaging apparatus is in the use state based on any one or a combination of conditions including detection of holding of a grip, detection of an eye looking into a viewfinder, detection of an operation by a user, and detection of a tilt of the one imaging apparatus.

6. The method according to claim 5, further comprising bringing the other imaging apparatus into a power-saving state, in a case where shifting of the other imaging apparatus from the use state to a non-use state is determined in the determining of the use state.

7. The method according to claim 1, wherein the determining is performed in a case where at least one of conditions is satisfied, and the conditions include a condition that an elapsed time from a time when the other imaging apparatus performs image capturing is within a fixed period, a condition that a position or an image capturing direction of each of the other imaging apparatus and the one imaging apparatus is within a predetermined range, and a condition that an object, an image of which is captured by the other imaging apparatus, is detected by the one imaging apparatus.

8. The method according to claim 1, wherein, in the determining, in a case where a lens attached to the one imaging apparatus is a zoom lens, a focal length of the zoom lens is divided into a plurality of lengths, and the image capturing parameter is determined by the other imaging apparatus based on an area that varies in size depending on each of the lengths.

9. The method according to claim 1, wherein the determining is performed in response to an operation by a user.

10. An imaging apparatus comprising:
    an imaging unit configured to image an object;
    an acquisition unit configured to acquire information about an image capturing angle of view of an other imaging apparatus and information about an image capturing parameter or evaluation value of the other imaging apparatus;
    a comparison unit configured to perform a comparison between an image capturing angle of view of the imaging unit and the image capturing angle of view of the other imaging apparatus;
    a correction unit configured to correct the acquired image capturing parameter or evaluation value, based on a result of the comparison by the comparison unit; and
    a control unit configured to control image capturing using the image capturing parameter or evaluation value corrected by the correction unit.

11. The imaging apparatus according to claim 10, further comprising a determination unit configured to determine whether the imaging apparatus itself is in a use state,
    wherein the acquisition unit acquires the information about the image capturing angle of view of the other imaging apparatus and the information about the image capturing parameter or evaluation value of the other imaging apparatus, when the determination unit determines the imaging apparatus shifts from a non-use state to the use state.

12. A method for controlling a plurality of imaging apparatuses that communicate with each other, the method comprising:
    determining whether one imaging apparatus among the plurality of imaging apparatuses shifts from a non-use state to a use state;
    acquiring information about an image capturing parameter or evaluation value of an other imaging apparatus, when the one imaging apparatus shifts to the use state; and
    performing image capturing with the one imaging apparatus, using an image capturing parameter determined based on the acquired information about the image capturing parameter or the evaluation value of the other imaging apparatus.

13. The method according to claim 12, wherein the image capturing parameter to be used in the one imaging apparatus is determined by either the one imaging apparatus or the other imaging apparatus.

14. The method according to claim 12, further comprising acquiring information about an image capturing angle of view of each of the one imaging apparatus and the other imaging apparatus, wherein the image capturing parameter to be used in the one imaging apparatus is determined based on an area, within a predetermined range, corresponding to the image capturing angle of view of the one imaging apparatus with a focus position in an image captured by the other imaging apparatus as a center, in a case where the image capturing angle of view of the one imaging apparatus is smaller than the image capturing angle of view of the other imaging apparatus.

15. The method according to claim 12, wherein the image capturing parameter to be used in the one imaging apparatus is determined based on an entire image captured by the other imaging apparatus, in a case where the image capturing angle of view of the one imaging apparatus is larger than the image capturing angle of view of the other imaging apparatus.

16. The method according to claim 12, wherein, in the determining, whether the one imaging apparatus is in the use state is determined based on any one or a combination of conditions including detection of holding of a grip, detection of an eye looking into a viewfinder, detection of an operation by a user, and detection of a tilt of the one imaging apparatus.

17. The method according to claim 12, wherein, in the performing of the image capturing, the one imaging apparatus performs image capturing using the determined image capturing parameter in a case where at least one of conditions is satisfied, and the conditions include a condition that an elapsed time from a time when the other imaging apparatus performs image capturing is within a fixed period, a condition that a position or an image capturing direction of each of the other imaging apparatus and the one imaging apparatus is within a predetermined range, and a condition that an object an image of which is captured by the other imaging apparatus is detected by the one imaging apparatus.

18. The method according to claim 12, wherein, in a case where a lens attached to the one imaging apparatus is a zoom lens, a focal length of the zoom lens is divided into a plurality of lengths, and the image capturing parameter to be used in the one imaging apparatus is determined by the other imaging apparatus based on an area that varies in size depending on each of the lengths.

19. The method according to claim 12, further comprising:
   determining whether the other imaging apparatus shifts from the use state to the non-use state when the one imaging apparatus shifts to the use state; and
   bringing the other imaging apparatus into a power-saving state in case where it is determined that the other imaging apparatus shifts to the non-use state.

* * * * *